(12) United States Patent
Wang et al.

(10) Patent No.: US 7,791,988 B2
(45) Date of Patent: Sep. 7, 2010

(54) METHOD AND APPARATUS OF DETERMINING BIAS VOLTAGE OF SERVO SIGNAL IN OPTICAL DISC DRIVE

(75) Inventors: Chin-Kai Wang, Tai-Nan (TW);
Che-Sheng Lin, Panchiao (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 734 days.

(21) Appl. No.: 11/733,207

(22) Filed: Apr. 10, 2007

(65) Prior Publication Data
US 2007/0242576 A1    Oct. 18, 2007

(30) Foreign Application Priority Data
Apr. 10, 2006    (TW) .............................. 95112670 A

(51) Int. Cl.
*G11B 7/00*    (2006.01)
(52) U.S. Cl. ................................. 369/44.35; 369/53.28
(58) Field of Classification Search ........................ None
See application file for complete search history.

(56) References Cited

U.S. PATENT DOCUMENTS

| | | | |
|---|---|---|---|
| 5,142,520 A | 8/1992 | Yanagi | |
| 5,703,848 A * | 12/1997 | Hofer | 369/44.29 |
| 6,252,835 B1 | 6/2001 | Choi | |
| 6,285,634 B1 * | 9/2001 | Abe et al. | 369/44.11 |
| 6,459,663 B1 | 10/2002 | Hayami | |
| 6,556,525 B1 * | 4/2003 | Takiguchi | 369/53.24 |
| 6,577,566 B1 * | 6/2003 | Tomita | 369/44.26 |
| 6,946,633 B2 * | 9/2005 | Takaba et al. | 250/201.5 |
| 6,985,412 B1 * | 1/2006 | Bradshaw et al. | 369/44.29 |
| 2004/0071054 A1 * | 4/2004 | Watanabe et al. | 369/44.29 |
| 2007/0008838 A1 * | 1/2007 | Takaoka et al. | 369/44.26 |

FOREIGN PATENT DOCUMENTS

TW    546644    8/2003

* cited by examiner

Primary Examiner—Paul Huber
(74) Attorney, Agent, or Firm—Winston Hsu

(57) ABSTRACT

A method for determining a bias voltage of a servo signal of an optical disc drive is disclosed. The method includes: generating a plurality of sensing signals via an optical sensor of the optical disc drive; generating a first and a second servo signals according to the sensing signals; adjusting the first and the second servo signals to generate a first and a second adjusted signal respectively; and determining the bias voltage of the servo signal according to the first and the second adjusted signals.

20 Claims, 6 Drawing Sheets

METHOD AND APPARATUS OF DETERMINING BIAS VOLTAGE OF SERVO SIGNAL IN OPTICAL DISC DRIVE

BACKGROUND OF THE INVENTION

1. Field of the Invention

The present invention relates to an optical disc drive, and more particularly, to a method of determining bias voltage of a servo signal in an optical disc drive and an apparatus thereof.

2. Description of the Prior Art

An optical disc drive generates servo signals by synthesizing four signals (i.e. A, B, C and D signals) received by an optical sensor. For example, the focus error (FE) signal and the tracking error (TE) signal are two common servo control signals, wherein the FE signal is equal to a signal sum (A+C) minus a signal sum (B+D), and the TE signal is equal to a signal sum (A+D) minus a signal sum (B+D). The optical disc drive controls a pick-up head (PUH) to move in the vertical direction according to the FE signal and controls the pick-up head to move in the horizontal direction according to the TE signal.

Take a focus servo signal as an example. Please refer to FIG. 1 in conjunction with FIG. 2. FIG. 1 is a schematic diagram of the focus servo signal when its focusing position is correct, and FIG. 2 is a schematic diagram of the focus servo signal when a focusing deviation occurs. In FIG. 2, the solid line represents the characteristic in the actual operation, while the dotted line represents the characteristic in the ideal operation. As can be seen in FIG. 2, the focus servo signal is not optimal (unequal to zero) when focusing deviation occurs, and therefore the focus point is not locked to the correct focusing position.

SUMMARY OF THE INVENTION

One objective of the present invention is to provide an optical disc drive capable of correcting the influence of deviation of an optical sensor on a servo signal.

Another objective of the present invention is to provide an optical disc drive capable of correcting the influence of deviation of an optical sensor on a servo signal, reducing the circuit cost, and shortening the time spent on adjustments.

Another objective of the present invention is to provide an optical disc drive, wherein the adjustments applied to a focus servo signal and a tracking servo signal are independent from each other.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
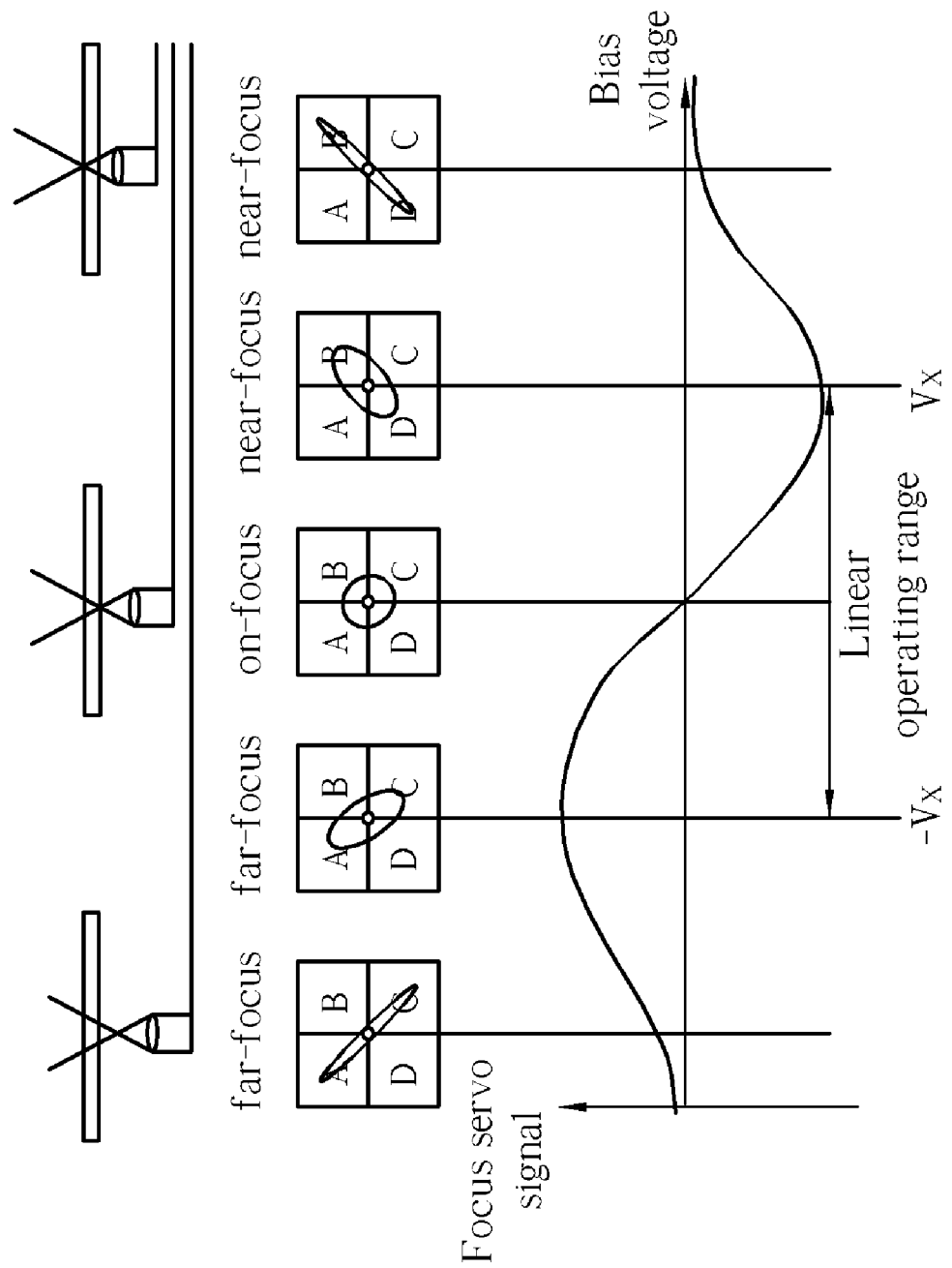
FIG. 1 is a schematic diagram of a focus servo signal when its focusing position is correct.
Figure 2:
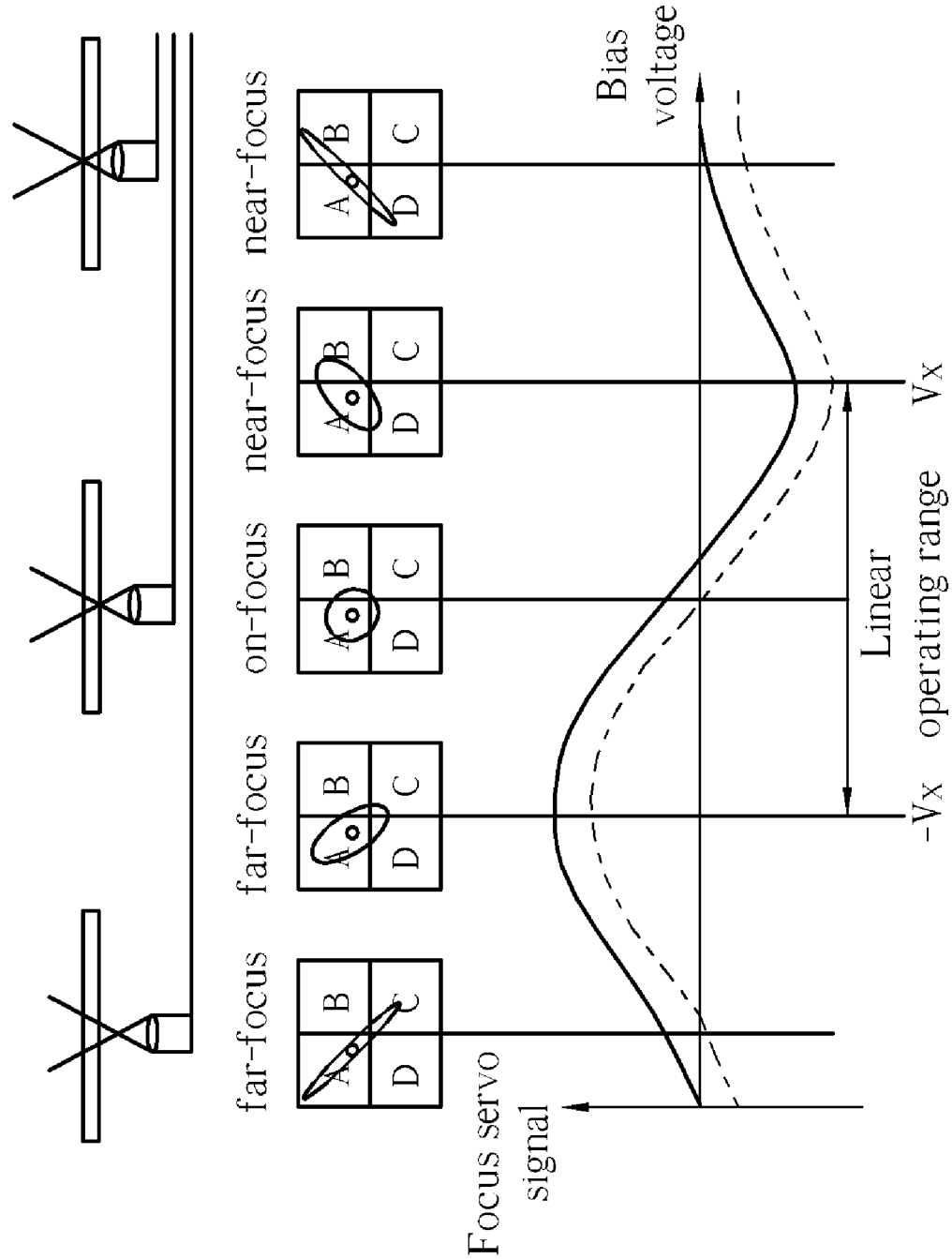
FIG. 2 is a schematic diagram of a focus servo signal when a focusing deviation occurs.
Figure 3:
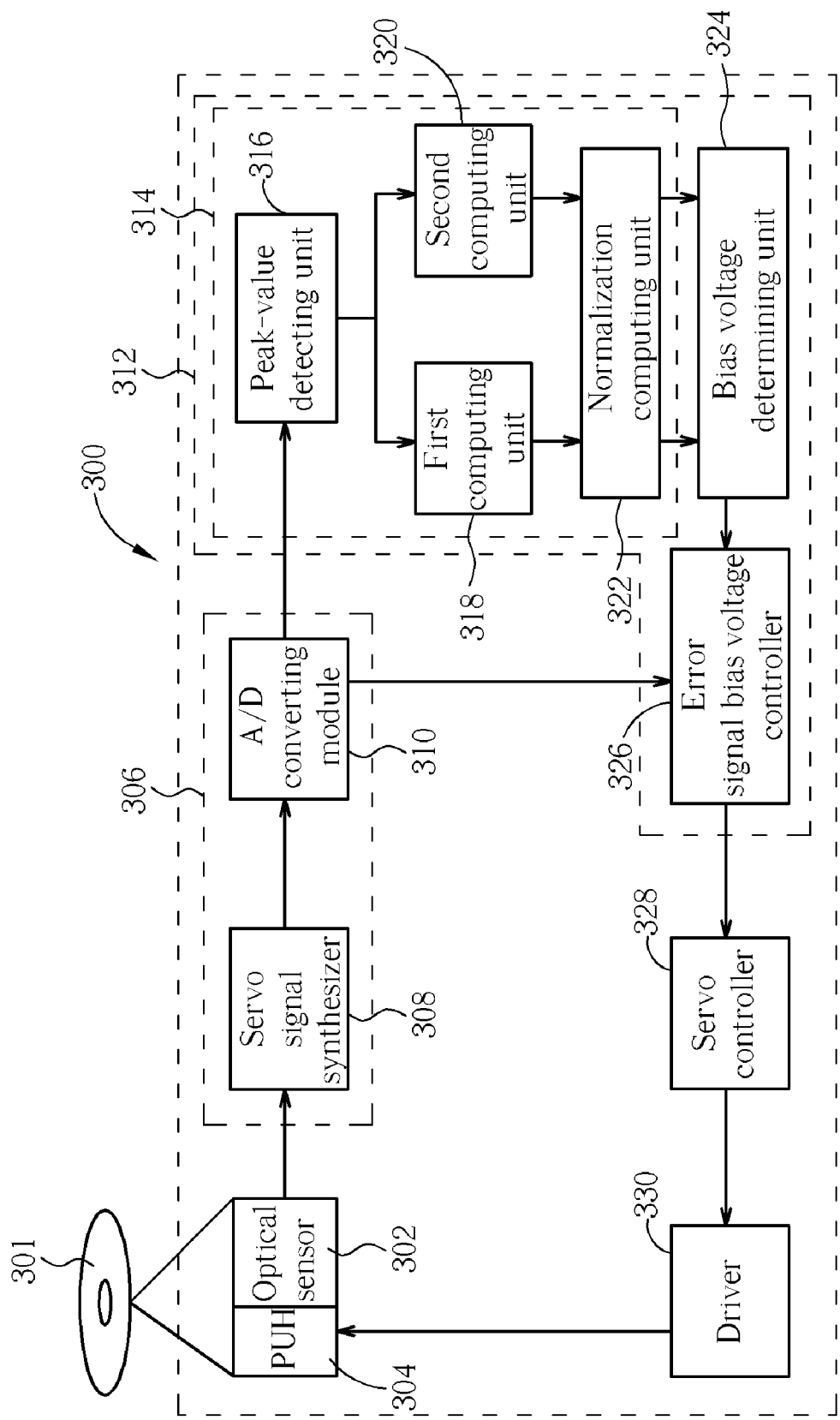
FIG. 3 is a schematic diagram of an optical disc drive equipped with a bias voltage determining apparatus according to one embodiment of the present invention.

Please refer to FIG. 3. FIG. 3 is a schematic diagram of an optical disc drive 300 according to an embodiment of the present invention. The optical disc drive 300 comprises a pick-up head 304 for accessing an optical disc 301. The pick-up head 304 comprises an optical sensor 302 having a plurality of sensing areas. The servo signal generator 306 comprises a servo signal synthesizer 308 and an analog-to-digital (A/D) converting module 310. The bias voltage adjusting device 312 comprises a gain adjuster 314, a bias voltage determining unit 324 and an error signal bias voltage controller 326. The gain adjuster 314, which is used to tune and calculate the gain of a servo signal, comprises a peak-value detecting circuit 316, a first computing unit 318, a second computing unit 320 and a normalization computing unit 322. In this embodiment, the optical disc drive 300 produces a plurality of testing bias voltages of a focus servo signal in the initial state. When performing the test of focusing, laser light spots produced by the pick-up head 304 focus on different positions of the optical disc 301 under each applied bias voltage and are reflected by the optical disc 301. According to the reflected signals of the laser light spots, the optical sensor 302 produces a plurality of sensing signals corresponding to different testing bias voltages.

The servo signal synthesizer 308 synthesizes signals $FE1\_{analog}(A+C)$, $FE2\_{analog}(B+D)$, and $FE\_{analog}((A+C)-(B+D))$ according to the sensing signals (A, B, C, D). After being digitized by the A/D converting module 310, the signals $FE1\_{analog}(A+C)$, $FE2\_{analog}(B+D)$, and $FE\_{analog}((A+C)-(B+D))$ are converted into a first servo signal $FE1\_{digital}$ (corresponding to A+C), a second servo signal $FE2\_{digital}$ (corresponding to B+D), and a servo error signal $FE\_{digital}$ (corresponding to (A+C)-(B+D)) respectively. These three digitized signals are then transmitted into the bias voltage adjusting device 312 for further processing. The gain adjuster 314 in the bias voltage adjusting device 312 receives signals $FE1\_{digital}$ and $FE2\_{digital}$ through the peak value detecting circuit 316. The first computing unit 318 and the second computing unit 320 then generate a first characteristic curve and a second characteristic curve (see FIG. 5 for details) according to signals $FE1\_{digital}$ and $FE2\_{digital}$, respectively. The first characteristic curve is based on one signal $FE1\_{digital}$ and its plurality of corresponding testing bias voltages, while the second characteristic curve is based on the other signal $FE2\_{digital}$ and its plurality of corresponding testing bias voltages. Due to the deviation of the optical sensor 302, the first and the second characteristic curves are asymmetric. In order to generate normalized characteristic curves (see FIG. 6 for details), the normalization computing unit 322 normalizes and balances the asymmetric first and the second characteristic curves to get a desired bias voltage point (VB). Accordingly, the bias voltage deciding unit 324 then decides the desired bias voltage according to the intersection of these two normalized characteristic curves. In the present embodiment, the normalization computing unit 322 can choose one or both of the two asymmetric characteristic curves to perform the normalization adjustment. After that, the error signal bias voltage controller 326 generates a bias voltage control signal according to the servo error signal $FE_{\_digital}$ and the bias voltage decided by the bias voltage deciding unit 324, and transmits the bias voltage control signal to the servo controller 328. Finally, the driver 330 adjusts the pick-up head 304 according to the servo control signal generated by the servo controller 328.

Figure 4:
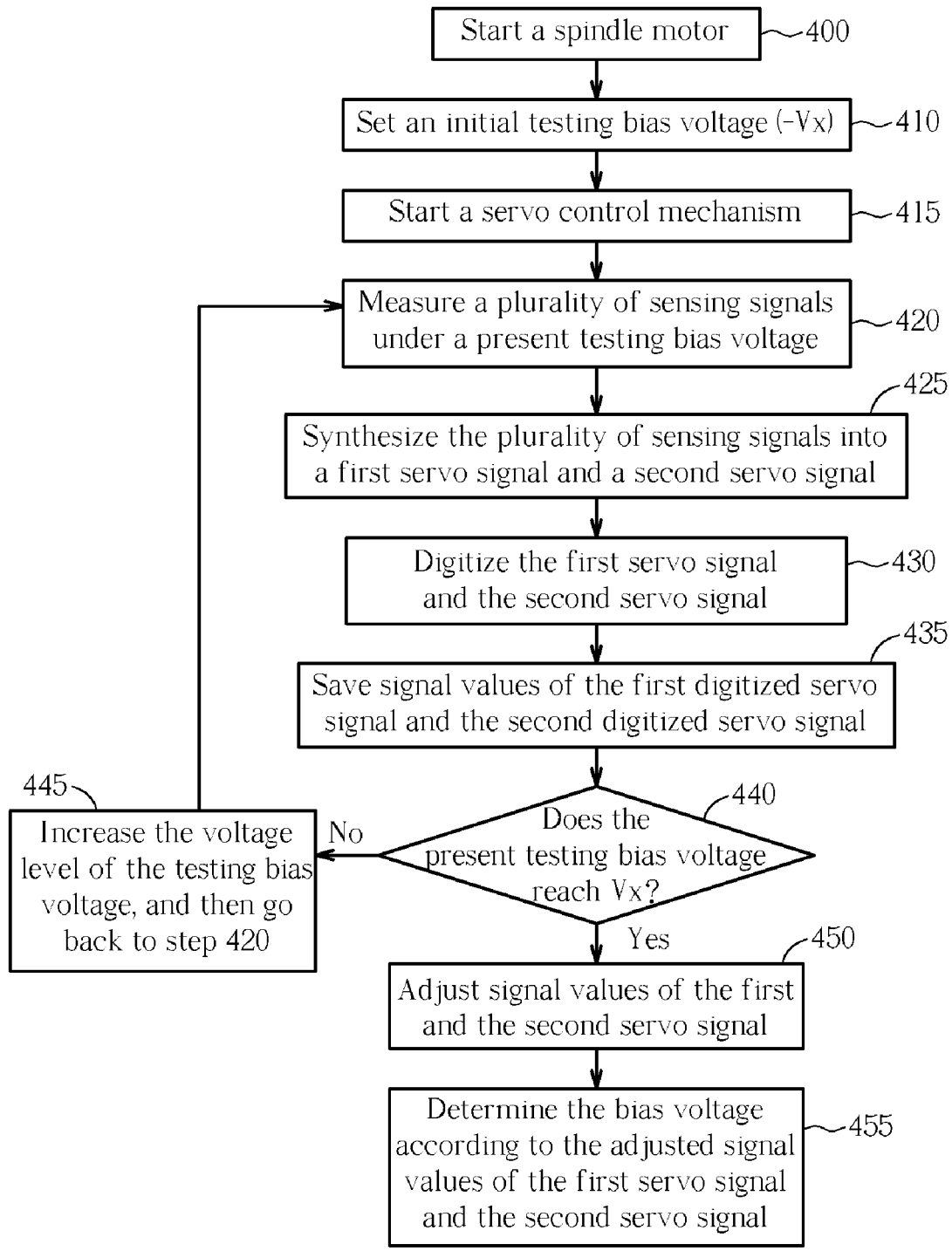
FIG. 4 is a flow chart illustrating a method of determining bias voltage according to one embodiment of the present invention.

Please refer to FIG. 4. FIG. 4 is a flow chart illustrating a method of determining the bias voltage according to an embodiment of the present invention. The steps of the flow chart are shown as below:

Step 400: Start a spindle motor.
Step 410: Set an initial testing bias voltage (−Vx).
Step 415: Start a servo control mechanism.
Step 420: Measure a plurality of sensing signals under a present testing bias voltage.
Step 425: Synthesize the plurality of sensing signals into a first servo signal and a second servo signal.
Step 430: Digitize the first servo signal and the second servo signal.
Step 435: Save signal values of the first digitized servo signal and the second digitized servo signal.
Step 440: Does the present testing bias voltage reach Vx? If yes, proceed with step 450; otherwise, go to step 445.
Step 445: Increase the voltage level of the testing bias voltage, and then go back to step 420.
Step 450: Adjust signal values of the first and the second servo signal.
Step 455: Determine the bias voltage according to the adjusted signal values of the first servo signal and the second servo signal.

Take the focus servo signal as an example. In the present embodiment, when an optical disc is loaded, the spindle motor is driven to start rotating the optical disc (step 400). Then the optical disc drive 300 determines an initial testing bias voltage such as −Vx (step 410), and then adjusts it from −Vx to Vx step by step. Once the initial testing bias voltage is determined, the focus servo system will be actuated to focus the laser light spots on the optical disc (step 415). At that time, the optical sensor 302 measures the amplitude of a plurality of sensing signals (for example, the conventional sensing signals A, B, C and D) (step 420). After that, the servo signal synthesizer 308 will synthesize signals $FE1_{\_analog}(A+C)$ and $FE2_{\_analog}(B+D)$ according to the sensing signals measured by the optical sensor 302 (step 425). The A/D converting module 334 then digitizes signals $FE1_{\_analog}(A+C)$ and $FE2_{\_analog}(B+D)$ to generate signal values $FE1_{\_digital}$ and $FE2_{\_digital}$ (step 430), respectively. In step 435, signal values $FE1_{\_digital}$ and $FE2_{\_digital}$ will be saved in a register or a storing unit, and used for bias voltage computation in the later step. As mentioned above, the optical disc drive 300 adjusts the testing bias voltage of the servo signal step by step until the testing bias voltage reaches Vx (step 445). Once Vx is reached, the bias voltage can be determined according to known testing results, and the associated operation is described in the following.

Ideally, the two curves delineating the relationship of the signal values $FE1_{\_digital}$ and $FE2_{\_digital}$ to the bias voltages should be symmetric, and the intersection of these two symmetric curves represents the optimal focus point. However, due to the deviation resulting from manufacturing processes or the placement position of the optical sensor, the two curves delineating the relationship of the signal values $FE1_{\_digital}$ and $FE2_{\_digital}$ to the bias voltages become asymmetric. In order to find the optimal bias voltage setting, the present invention utilizes the normalization computing unit 322 to normalize the signal values $FE1_{\_digital}$ and $FE2_{\_digital}$ with respect to the testing bias voltages (from −Vx to Vx) to generate the normalized signal values $FE1_{\_digital}$ and $FE2_{\_digital}$ corresponding to the testing bias voltages (from −Vx to Vx) (Step 450). At the end, the bias voltage determining unit 324 determines the desired bias voltage according to the normalized signal values $FE1_{\_digital}$ and $FE2_{\_digital}$ (step 455).

Figure 5:
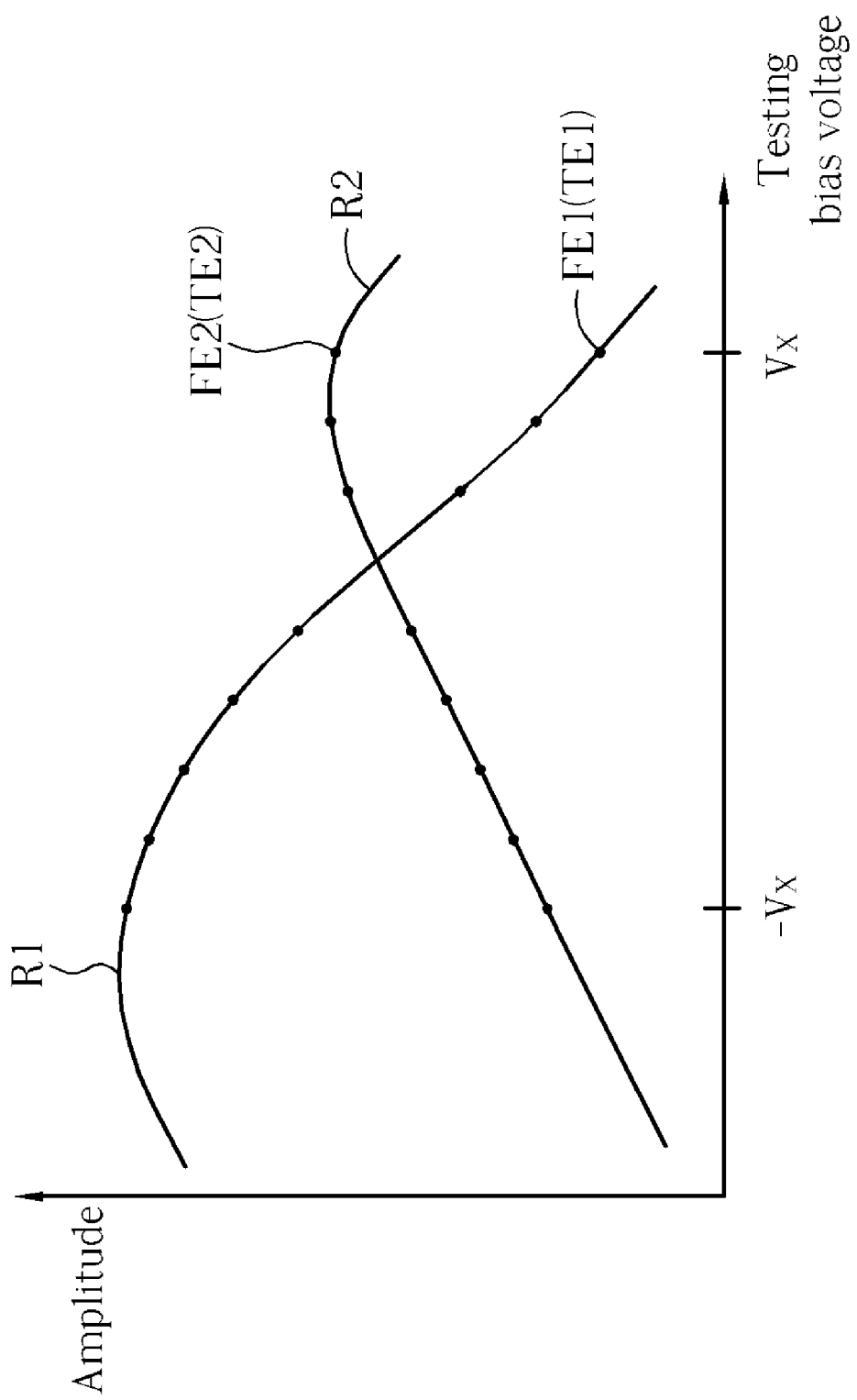
FIG. 5 is a schematic diagram illustrating the characteristics of a first servo signal FE1 and a second servo signal FE2 with respect to testing bias voltages.
Figure 6:
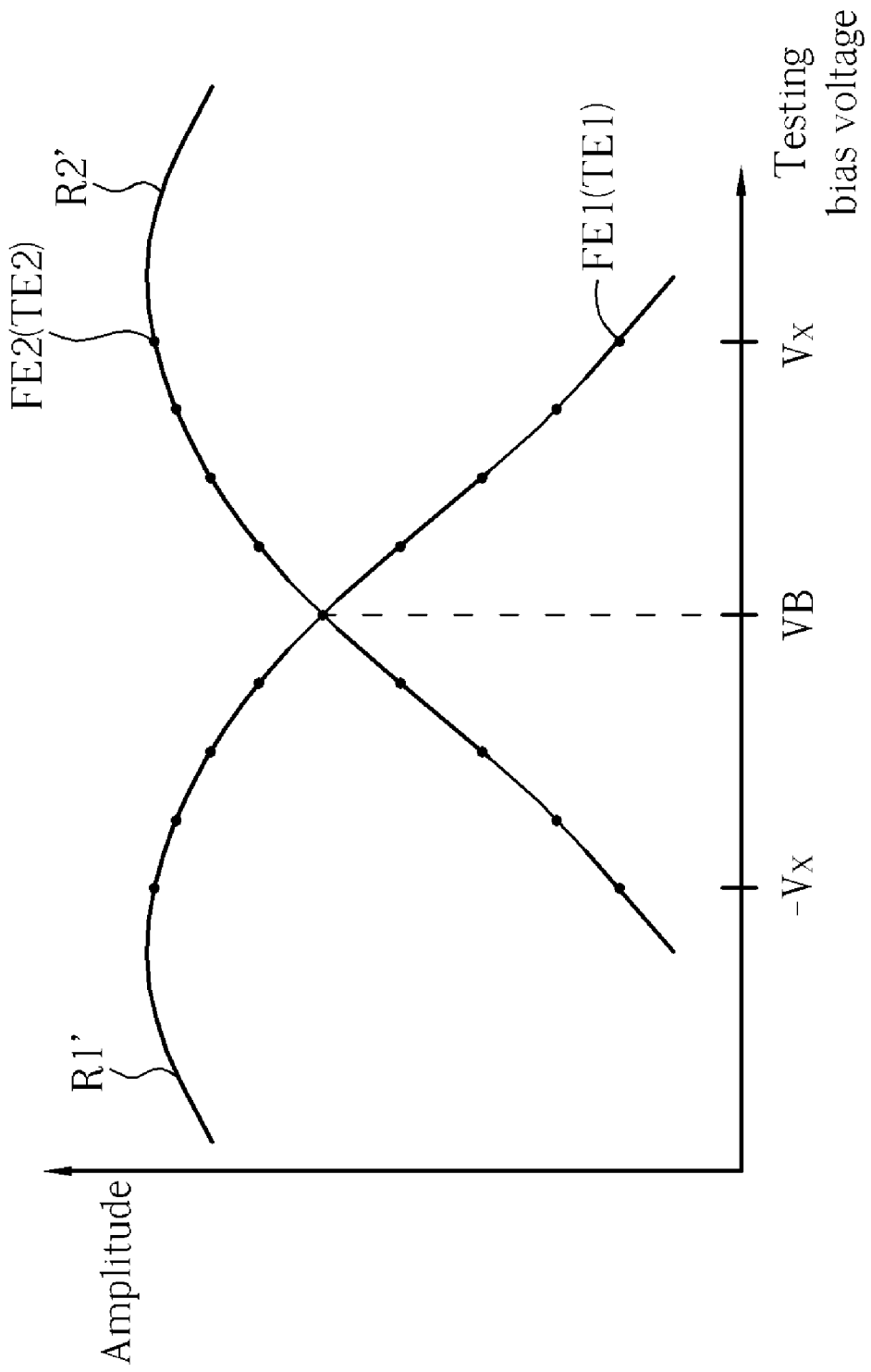
FIG. 6 is a schematic diagram illustrating the characteristics of the normalized first servo signal FE1 and the normalized second servo signal FE2 with respect to testing bias voltages.

Please refer to FIG. 5 in conjunction with FIG. 6. FIG. 5 is a diagram of the characteristics of the measured first servo signal FE1 and the second servo signal FE2 corresponding to different testing bias voltages; FIG. 6 is a schematic diagram of the characteristics of the normalized first servo signal FE1 and the normalized second servo signal FE2 corresponding to the testing bias voltages. As shown in FIG. 5, the characteristic curve R1 delineating the relationship between the first servo signal FE1 and its corresponding testing bias voltage (from −Vx to Vx), and the characteristic curve R2 delineating the relationship between the second servo signal FE2 and its corresponding testing bias voltage (from −Vx to Vx), are not symmetric. However, after performing the normalization on the servo signals, the new characteristic curve R1' delineating the relationship between the normalized first servo signal FE1 and the corresponding testing bias voltage (from −Vx to Vx), and the new characteristic curve R2' delineating the relationship between the normalized second servo signal FE2 and the corresponding testing bias voltage (from −Vx to Vx), become symmetric. The optimal bias voltage is then found as the bias voltage VB corresponding to the intersection of the curve R1' and the curve R2'. In the present embodiment, a curve fitting method can be used to estimate the function (i.e. a second order polynomial function) representing R1' and representing R2'. The optimal bias voltage VB is then obtained as the solution of the functions representing R1' and R2' respectively. However, the method that the present invention adopts to obtain the bias voltage is not limited to the above exemplary embodiment.

Furthermore, although the embodiment disclosed above takes the focus servo signal as one example of the servo signal to be processed, the same method and architecture of the embodiment of the present invention can also be applied to a tracking servo signal. The decision of the bias voltage applied to the tracking error (TE) signal is independent of that applied to the focus error signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a bias voltage of a servo signal of an optical disc drive, comprising:

generating a plurality of sensing signals via an optical sensor of the optical disc drive;

generating a first servo signal and a second servo signal according to the sensing signals;

adjusting gain of at least one of the first servo signal and the second servo signal to generate a first adjusted signal and a second adjusted signal respectively; and determining the bias voltage of the servo signal according to the first adjusted signal and the second adjusted signal;

wherein the step of determining the bias voltage further comprises:

determining a first characteristic curve according to the first adjusted signal;

determining a second characteristic curve according to the second adjusted signal; and determining the bias voltage according to the first characteristic curve and the second characteristic curve.

2. The method of claim 1, wherein the step of determining the bias voltage further comprises:
determining the bias voltage according to an intersection of the first characteristic curve and the second characteristic curve.

3. The method of claim 1, wherein the servo signal is a tracking error signal.

4. The method of claim 1, wherein the servo signal is a focus error signal.

5. The method of claim 1, wherein the servo signal comprises a tracking error signal and a focus error signal, and the steps of determining a bias voltage of the tracking error signal and determining a bias voltage of the focus error signal are independent from each other.

6. The method of claim 1, wherein the step of generating the first and the second servo signals further comprises:
synthesizing the plurality of sensing signals to generate a first synthesizing signal and a second synthesizing signal; and
converting the first and the second synthesizing signals into the first and the second servo signals respectively.

7. An apparatus for determining a bias voltage of a servo signal of an optical disc drive, comprising:
a servo signal generator, for generating a first servo signal and a second servo signal according to a plurality of sensing signals generated via an optical sensor of the optical disc drive;
a gain adjuster, for adjusting gain of at least one of the first servo signal and the second servo signal to generate a first adjusted signal and a second adjusted signal respectively; and
a bias voltage deciding unit, for determining the bias voltage of the servo signal according to the first and the second adjusted signals;
wherein the gain adjuster comprises:
a first computing unit, for determining a first characteristic curve according to the first servo signal and a plurality of testing bias voltages corresponding to the plurality of sensing signals;
a second computing unit, for determining a second characteristic curve according to the second servo signal and the plurality of testing bias voltages corresponding to the plurality of sensing signals; and
a normalization computing unit, coupled to the first computing unit and the second computing unit, for adjusting at least one of the first characteristic curve and the second characteristic curve to generate the first and the second adjusted signals respectively.

8. The apparatus of claim 7, wherein the servo signal is a tracking error signal.

9. The apparatus of claim 7, wherein the servo signal is a focus error signal.

10. The apparatus of claim 7, wherein the servo signal generator comprises:
a servo signal synthesizer, for synthesizing the plurality of the sensing signals to generate a first synthesizing signal and a second synthesizing signal; and
an analog-to-digital converting module, coupled to the servo signal synthesizer, for digitizing the first and the second synthesizing signals to generate the first and the second servo signals respectively.

11. The apparatus of claim 7, wherein the servo signal generator generates a servo error signal according to the plurality of sensing signals.

12. The apparatus of claim 11, further comprising:
a bias voltage controller, for generating a bias voltage control signal according to the servo error signal and the bias voltage.

13. The apparatus of claim 12, further comprising:
a servo controller, for generating a servo control signal according to the bias voltage control signal.

14. A method for determining a bias voltage of an optical disc drive to control an optical head, comprising:
generating a plurality of testing voltages to control the optical head;
generating a plurality of sensing signals by the optical head according to the testing voltages;
generating a plurality of first servo signal values and a plurality of second servo signal values according to the sensing signals;
calculating at least one of the first servo signal values and the second servo signal values to generate a plurality of first calculated values and a plurality of second calculated values respectively, wherein the first calculated values and the second calculated values are substantially symmetric; and
determining the bias voltage of the optical disc drive to control the optical head according to the first calculated values and the second calculated values.

15. The method of claim 14, wherein the step of deciding the bias voltage further comprises:
determining the bias voltage according to an intersection of the first calculated values and the second calculated values.

16. The method of claim 14, further comprises:
storing the first servo signal values and the second servo signal values into a storing unit.

17. The method of claim 14, wherein the first servo signal values and the second servo signal values are focus error signal values.

18. A method for determining a bias voltage, comprising:
generating a plurality of sensing signals via a sensor;
generating a first signal and a second signal according to the sensing signals;
adjusting gain of at least one of the first signal and the second signal to generate a first adjusted signal and a second adjusted signal respectively; and
determining the bias voltage according to the first adjusted signal and the second adjusted signal;
wherein the step of determining the bias voltage further comprises:
determining a first characteristic curve according to the first adjusted signal;
determining a second characteristic curve according to the second adjusted signal; and
determining the bias voltage according to the first characteristic curve and the second characteristic curve.

19. The method of claim 18, wherein the step of determining the bias voltage further comprises:
determining the bias voltage according to an intersection of the first characteristic curve and the second characteristic curve.

20. The method of claim 18, wherein the step of generating the first and the second signals further comprises:
synthesizing the plurality of sensing signals to generate a first synthesizing signal and a second synthesizing signal; and
converting the first and the second synthesizing signals into the first and the second signals respectively.

* * * * *